United States Patent [19]
Yasuda

[11] Patent Number: 5,170,965
[45] Date of Patent: Dec. 15, 1992

[54] HANG GLIDER WHICH CAN FLY BY HUMAN STRENGTH

[76] Inventor: Hiroaki Yasuda, 12-1107, 5-ban, Honjocho 2-chome, Higashinada-ku, Kobe, Japan

[21] Appl. No.: 693,595

[22] Filed: Apr. 30, 1991

[51] Int. Cl.⁵ .............................................. B64C 31/04
[52] U.S. Cl. .................................. 244/64; 244/22; 244/11; 244/72; 244/900
[58] Field of Search .............. 244/64, 22, 11, 16, 244/72, 28, 900

[56] References Cited

U.S. PATENT DOCUMENTS

| | | | |
|---|---|---|---|
| 999,715 | 8/1911 | Gundersen | 244/11 |
| 1,036,033 | 8/1912 | Twining | 244/64 |
| 1,444,138 | 2/1923 | Piering | 244/64 |
| 1,783,029 | 11/1930 | White | 244/72 |
| 4,053,122 | 10/1977 | Gar | 244/64 |
| 4,417,707 | 11/1983 | Leong | 244/64 |

FOREIGN PATENT DOCUMENTS

| | | | |
|---|---|---|---|
| 138478 | 10/1947 | Australia | 244/64 |
| 473330 | 1/1974 | Australia | 244/900 |
| 3314130 | 10/1984 | Fed. Rep. of Germany | 244/11 |
| 560905 | 4/1957 | Italy | 244/11 |
| 9931 | 2/1916 | United Kingdom | 244/11 |

*Primary Examiner*—Joseph F. Peters, Jr.
*Assistant Examiner*—Anne E. Bidwell
*Attorney, Agent, or Firm*—Wenderoth, Lind & Ponack

[57] ABSTRACT

A human powered hang glider has a right main wing and a left main wing, both of which are swingably attached to a post by a universal joint. A rope is stretched in a loop shape between a pedal provided at a lower part of the post and the main wing, and is fixed to the pedal and the main wing. By operation of the pedals, the main wings are flapped like a bird flaps its wing. By this flapping action of the main wings, the hand glider can take wing, whether or not an upcurrent is present.

16 Claims, 6 Drawing Sheets

HANG GLIDER WHICH CAN FLY BY HUMAN STRENGTH

BACKGROUND OF THE INVENTION

1. Field of the Invention

This invention relates to a hang glider which can take off and fly by flapping its wings, like a bird, and also can soar with its wings kept stationary.

2. Description of the Prior Art

It had been a long-cherished dream of the mankind to glide through the sky by its own muscular strength, like a bird, and after repeated trial and error the so-called hang glider which can be controlled by a man hanging thereon was invented.

Hang gliders now in general use are of standard Rogallo type. Improvements of this standard Rogallo type are a roached batten tip type, a radial batten tip type, a truncated tip type, a truncated batten tip type, a curved tip type, and the like. Each of these hang gliders is constructed with leading edges arranged to intersect a keel at a forward point. Both leading edges are connected by a cross bar, a control bar is suspended from the cross bar, sailcloth is stretched over the leading edges and battens, and the wing is of fixed type. These hang gliders glide through the sky by catching an upcurrent and are controlled by maneuvering of the pilot's body weight on the control bar.

Although various types of hang gliders (i.e. hang gliders having varying wing shapes) have been disclosed as mentioned above, each of them has a wing fixed to a keel. With such hang gliders, the pilot is required to make an approach run so as to catch an upcurrent or to leap down from a high place. Therefore, it is necessary to find a location with a difference in altitude between the taking off point and the landing point, and even if the take off by way of an approach run is successful, it is difficult to soar continuously for many hours unless an upcurrent is caught properly by the wing.

SUMMARY OF THE INVENTION

An object of the present invention is to provide a hang glider which can not only soar by catching an upcurrent like conventional hang gliders, but can also take off, land and glide by flapping its main wings, like a bird, utilizing the strength of pilot's legs.

In order to attain the above object, the main point of the present invention is as follows. A forward end of a flexi-wing type right (left) main wing is attached swingably in up and down directions to the upward part of a post by a universal joint. A rope is stretched in a loop shape between a pedal mounted to a main frame projecting from the post at a predetermined angle and the right (left) main wing, and is fixed to the pedal and the main wing. By operating the pedal, both main wings are flapped in such a fashion that a leading edge moves upwardly and downwardly and precedes the upward and downward following movement of the trailing edge, thereby obtaining lift and thrust.

BRIEF DESCRIPTION OF THE DRAWINGS

The nature and advantage of the present invention will be understood more clearly from the following description made with reference to the accompanying drawings, in which.

DETAILED DESCRIPTION OF THE INVENTION

An explanation is made below about a hang glider which can glide by human strength according to the present invention, on the basis of the accompanying drawings.

In the drawings, reference numeral 1 designates a post which also acts as a control bar. The posts 1 are arranged vertically and in parallel with each other. The distance between the two posts 1 is such that a pilot can locate himself therebetween. Two keels 2 in parallel with each other are arranged in such a fashion that they intersect and are jointed with the posts 1. The distance between the two keels is substantially the same as that between the two posts 1. An upper frame 3 and a lower frame 4 are laid transversely at the upper end and at the intermediate part respectively of the posts 1, and the frames 3, 4 and the posts 1 are joined together. The upper and lower frames 3, 4 are in parallel with each other and intersect the posts 1. With this arrangement, when the hang glider according to the present invention is in a horizontal soaring state, the keels 2 are parallel to the soaring direction, the posts 1 intersect the keels 2 at right angles in vertical planes, and the upper and lower frames 3, 4 intersect the posts 1 in horizontal, lateral directions.

Figure 3A:
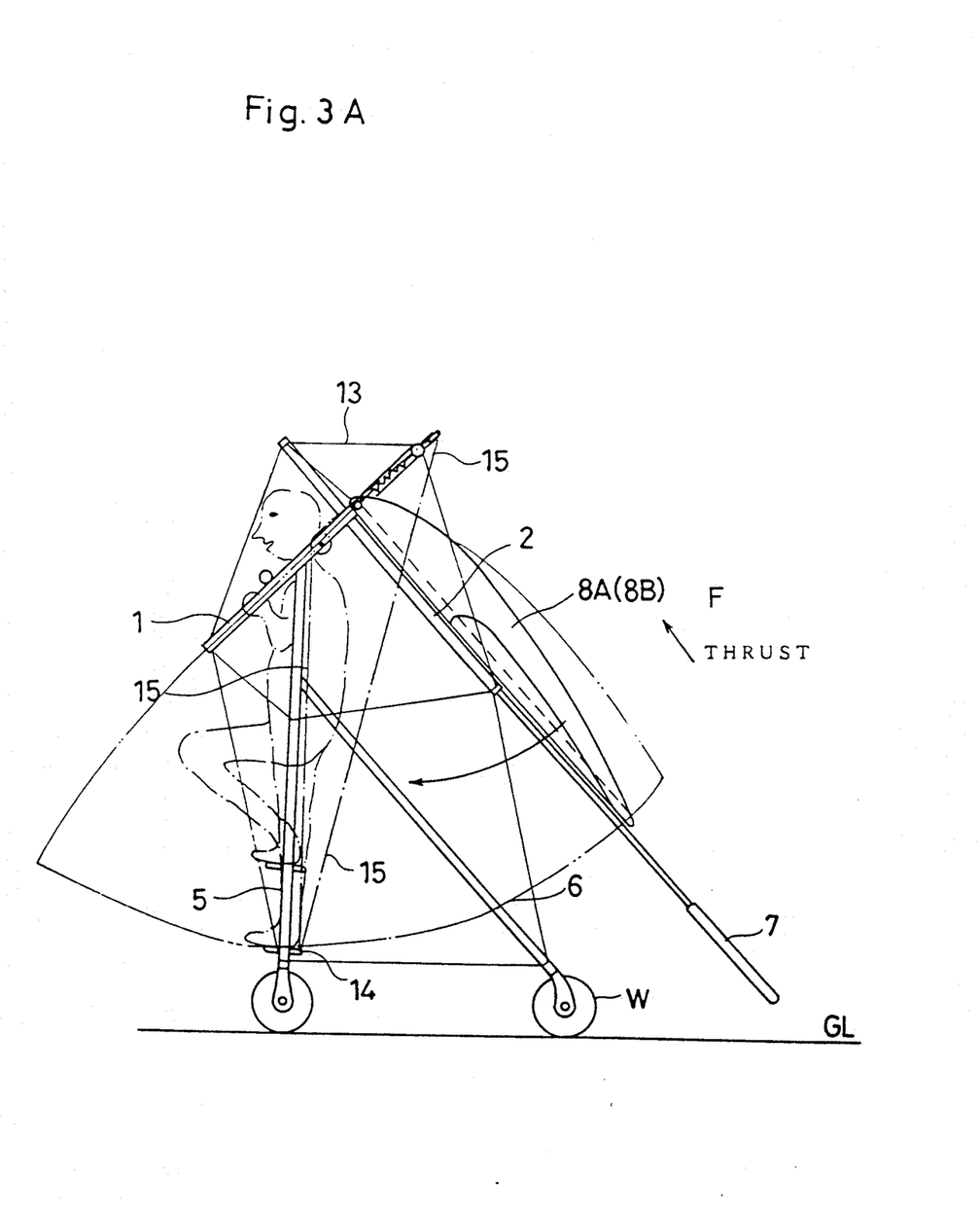
FIG. 3(A) and FIG. 3(B) are side views of the hang glider shown in FIG. 1.

Main frames 5 of suitable lengths are connected at a top ends thereof to intermediate parts of the posts 1, in parallel with the keels 2 or at a certain angle in relation to the keels 2. Auxiliary frames 6 are projected from the main frames 5 which are fixed in position. The main frames 5 and the auxiliary frames 6 are respectively connected to the posts 1. Wheels W are provided at the lower ends of each of the main frames and the auxiliary frames so as to support a load on the hang glider and also to assist the approach run by a pilot during takeoff. As shown in FIG. 3(A), the main frames 5 are set so that they are perpendicular or nearly perpendicular to the horizontal line when resting on the wheel W, such that the pilot will also be supported substantially vertically by a harness along the main frame 5 during takeoff, landing or when ascending. However, when soaring in a horizontal direction at the required altitude after ascending, the main wing 8A (8B) is put in a horizontal state and the main frames 5 are placed at a 30-60° angle of incidence (forward inclination).

The two keels 2, which are parallel with each other along most of their length, are crossed in an X-shape at a rear part thereof, and the resulting triangle to the rear of the intersecting point is made into a tail wing 7, on which a sailcloth is mounted. A main wing comprises a left main wing 8A and a right main wing 8B in symmetrical form. A flexible joint, for example, a universal joint 10 which is bendable in all directions (360°) is interposed between each of the posts 1 and the base end of a leading edge 81 of each the left main wing 8A and the right main wing 8B, whereby the left main wing 8A and the right main wing 8B are respectively attached to and supported by the posts 1 in such a fashion that both main wings 8A, 8B are swingable either simultaneously or individually in up and down directions, like a bird flapping its wings.

Since the left main wing 8A and the right main wing 8B are symmetrical with one another, only the left main wing 8A will be fully described.

The cord length, the spar and the wing shape should be provided so as to result in a wing area for the left and right main wings 8A, 8B which is predetermined on the basis of the wing surface load. Many battens 82 are provided at a regular pitch along the length of the leading edge 81 and intersecting the leading edge 81. Sailcloth 83 is laid on the surface of the leading edge 81 and the battens 82, to thereby obtain the desired main wing 8A. The cross sectional shape of the main wing with the battens is determined so that lift is effectively generated during soaring. The sailcloth 83 is attached to the leading edge 81 and to each batten 82, but not at the rear edge (trailing edge) of the wing, thereby resulting in a so-called flexi-wing section. A rear end portion of the sailcloth 83 adjacent the keel 2 is jointed to the keel 2 by a flexible rope 11, so that the rear edge (trailing edge) of the left main wing 8A is freely vertically swingable within a limited swinging angle, thereby preventing the trailing edge from flapping more than necessary. The left main wing 8A is attached to the post 1 by the universal joint 10. Since the wing surface loading on the main wing is mainly supported by the joint 10, the joint 10 should have ample strength. In order to keep the left main wing 8A and the right main wing 8B horizontal unless subjected to external force, a coil spring 12 is interposed between the upper frame 3 and the leading edge 81 of each main wing 8A, 8B. In order to prevent a sweepback angle larger than an allowable angle from occurring due to wind pressure during soaring, a rope 19 is stretched between a top end of the keel 2 and the leading edge 81.

In the drawings, reference numeral 13 designates a reinforcing wire stretched around each frame, the post and the keel for reinforcing the frames against loads to which they are subjected during soaring.

Since the left main wing 8A and the right main wing 8B are jointed to each post by the universal joint, swinging motion or flapping motion of the main wing (simultaneous flapping of both wings are flapping of either of them) can be done by working the pedals (to be described later). The hang glider according to the present invention can be used not only in the manner in which a conventional fixed main wing type hang glider can be used, i.e. by catching upcurrents created by a pilot's approach run or by leaping down from a high place, but can also be used in such a manner as to utilize human strength or muscular strength of a pilot's legs as mentioned below.

In the present invention, a pedal 14 is provided at the lower inside of each main frame 5 and a rope 15 is stretched in a loop shape between the pedal 14 and the main wing 8A (8B). The rope is passes over a roller provided at the upper frame 3 and a roller provided at the lower side of the main frame 5, and is fixed at the pedal and the main wing. By working the pedal 14, the main wing 8A (8B) is moved up and down with the universal joint 10 as a pivot. More particularly, when the pedal is forced downwardly the main wing 8A (8B) is drawn upwardly. The pedal is fixed to the leg of a pilot and by bending and stretching of the leg in up and down directions, the main wing is flapped through the medium of the rope 15. According to this flapping (swinging up and down) of the main wing, the leading edge 81 swings up and down, but the rear edge of the wing (trailing edge) swings a little later than the leading edge because of the previously discussed flexi-wing section. This relative swinging motion in up and down directions of the leading edge and the trailing edge causes bird-like flapping, whereby lift and thrust are obtained.

Figure 1:
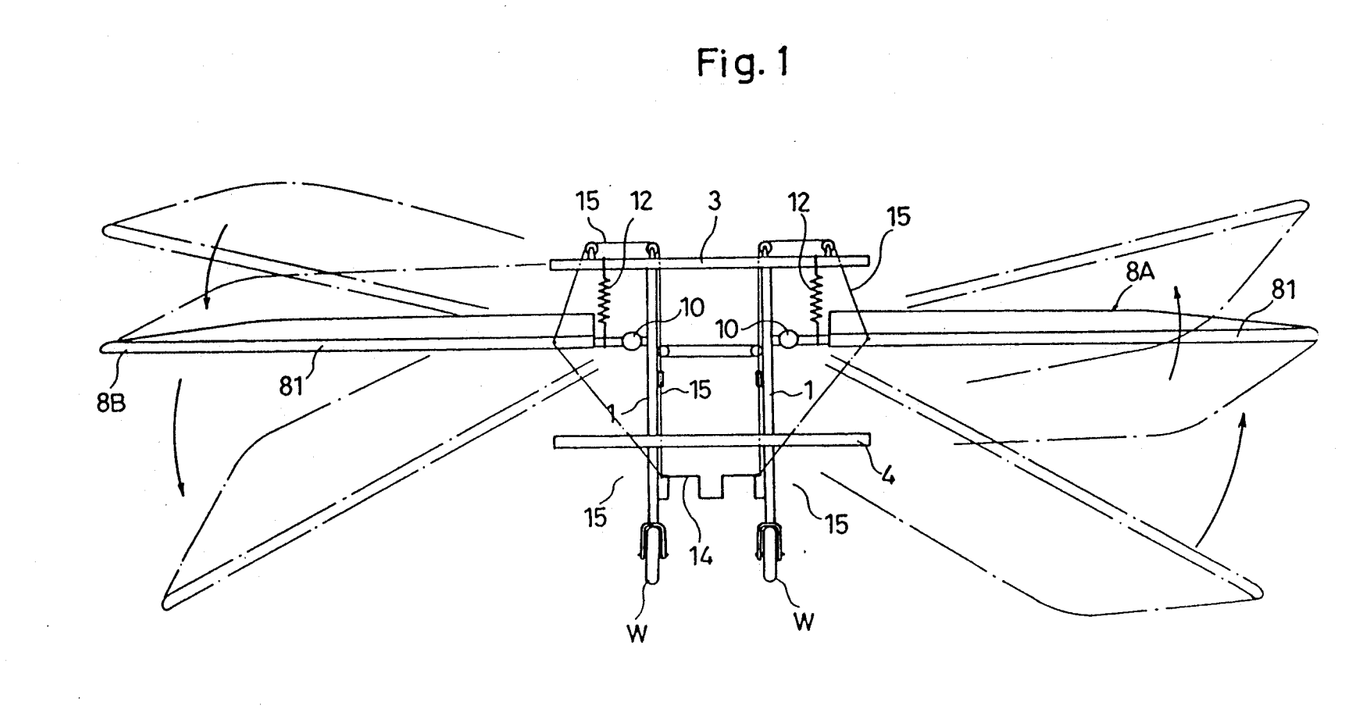
FIG. 1 is a front view of the hang glider according to the present invention.
Figure 2:
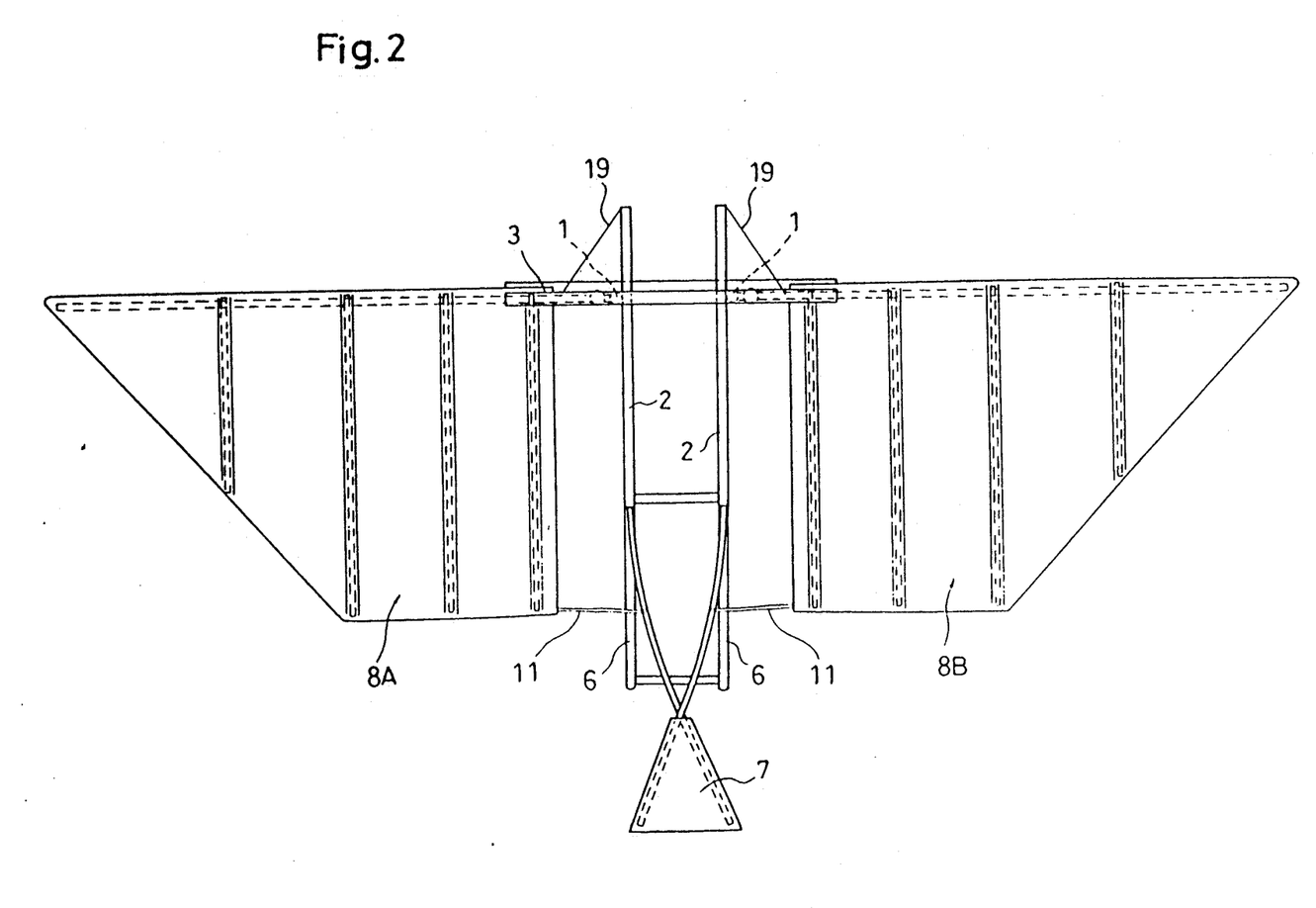
FIG. 2 is a plan view of the hang glider shown in FIG. 1.
Figure 5:
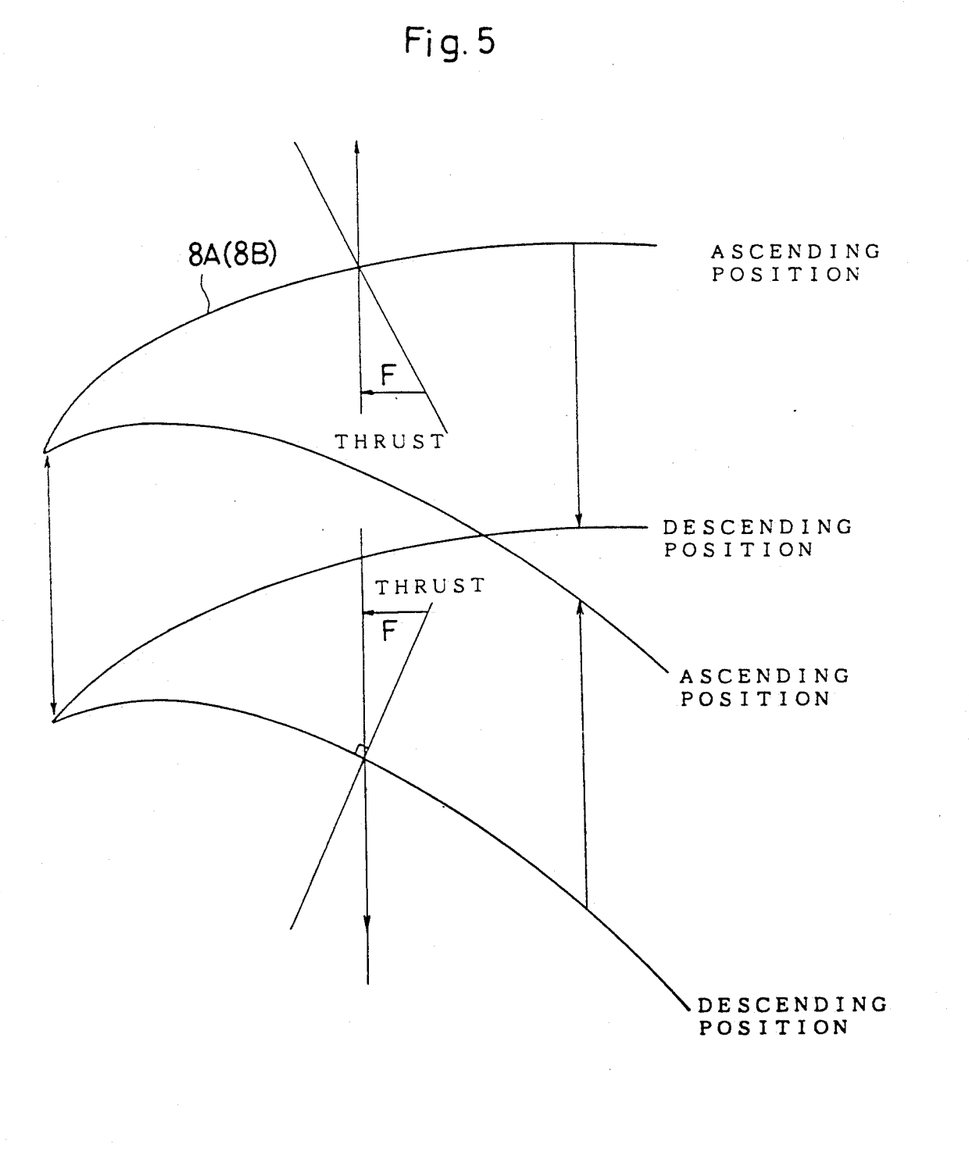
FIG. 5 is an explanatory drawing, showing how lift and thrust are obtained by flapping the main wings.

When the pedal is moved up and down by bending and stretching of the leg, the leading edge 81 of the main wing 8A (8B) is moved in up and down directions directly by the rope 15 attached to the pedal, but the rear edge (trailing edge) of the main wing is not moved directly by the rope 15. Therefore, the trailing edge of the main wing moves up and down with a specific time lag in relation to the leading edge. This causes the motion of the main wing to closely resemble the flapping of wings by a bird. As shown in FIG. 1 and FIG. 5, during flapping of the main wing the leading edge always moves, preceding the trailing edge, irrespective of whether the glider descends or ascends and therefore thrust F is obtained by up and down motion of the wing and soaring can be carried out. By carrying out this flapping motion of the main wing strongly and quickly, more thrust and lift can be obtained than could be obtained by merely catching upcurrents with the main wing kept stationary, and thus takeoff is made possible.

Figure 3B:
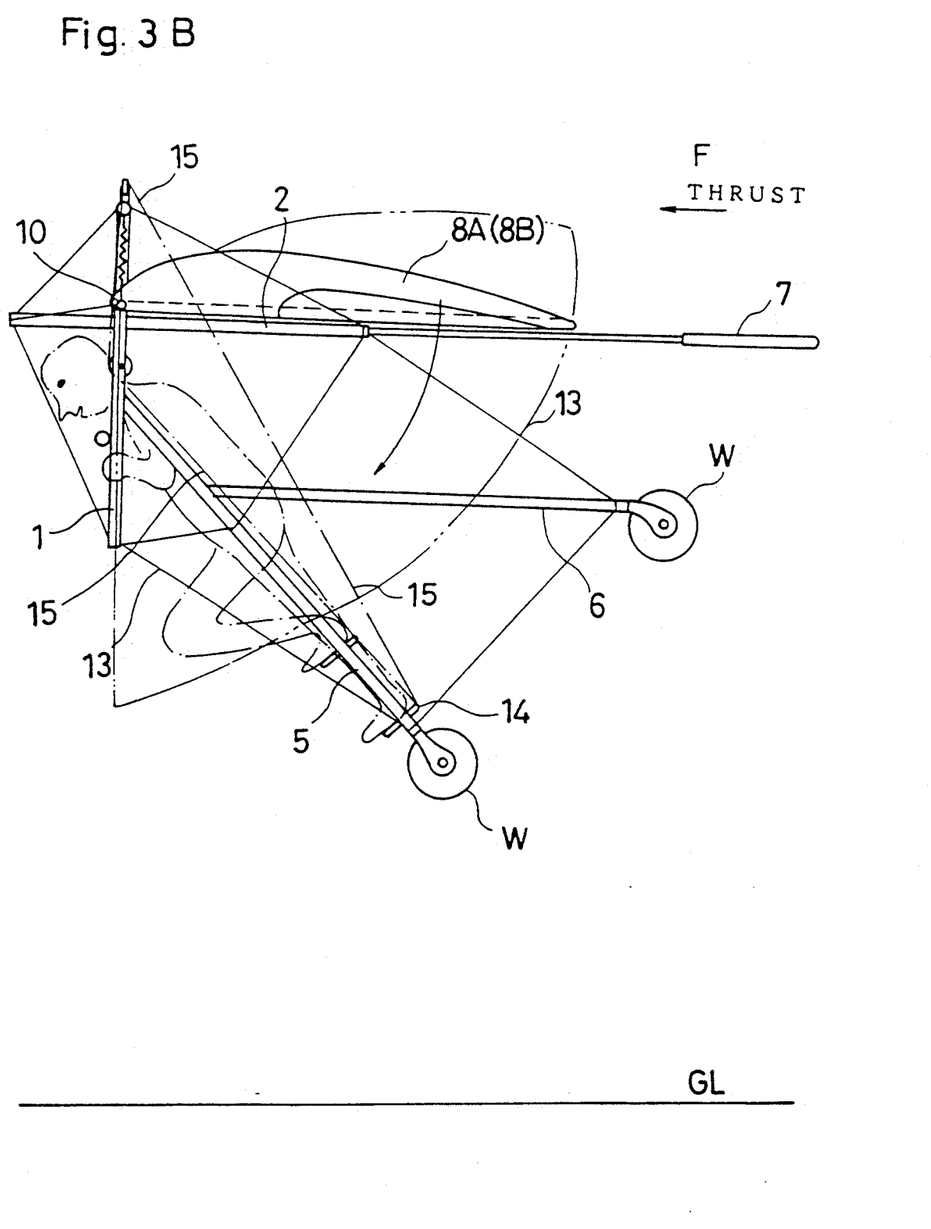
Figure 4:
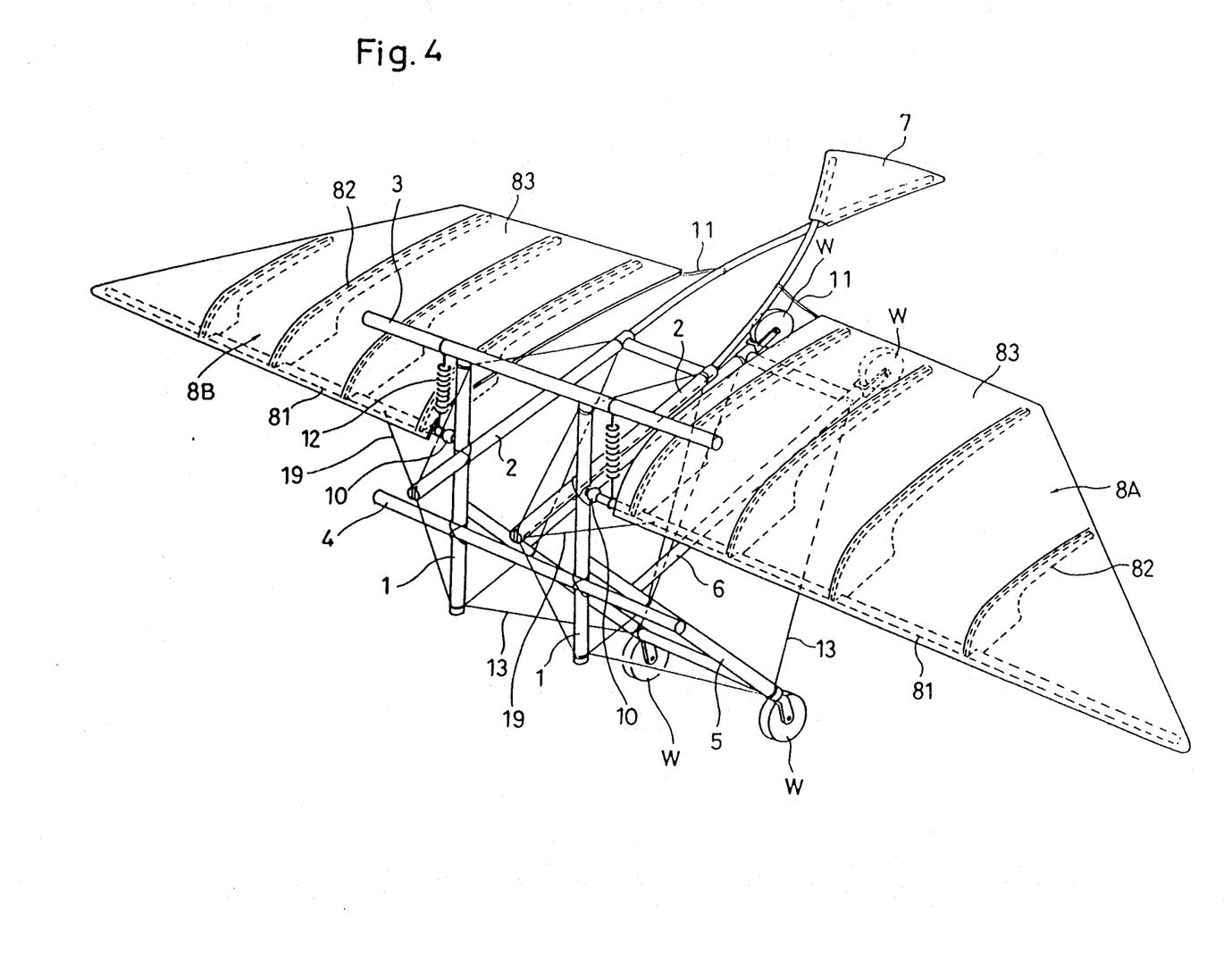
FIG. 4 is a perspective view of the hang glider shown in FIG. 1.

As shown in FIG. 3(A), when the hang glider is in a stationary state on the ground, a pilot stands in a perpendicular state and the main wing is placed at the required angle of incidence. By making the pedals move up and down simultaneously by a pilot, both main wings flap simultaneously in up and down directions and the hang glider obtains thrust and can take off. When the glider reaches the required altitude after ascending, it is put in a horizontal soaring state. At this time, by catching an upcurrent the hang glider can soar without flapping of the main wings, just like a bird soaring with both its wings kept stationary. In this horizontal soaring state, the pilot is forwardly inclined, as shown in FIG. 3(B).

While the hang glider is soaring, if either of the pedals is pressed downwardly, the main wing on the side of the pressed pedal is drawn downwardly to some extent, whereby a difference in lift is created between the right and the left main wings, causing the hang glider to lean toward the direction in which the main wing is drawn downwardly. In this manner, the soaring direction can be changed.

According to the present invention, the right main wing and the left main wing of flexi-wing type are attached swingably (can be flapped in up and down directions) to a post connected with frames by the universal joints, a rope is stretched in a loop shape between a pedal provided along a main frame provided at a post and the right (left) main wing, and both main wings are flapped by operation of the pedals to obtain lift and thrust. With this structure, the hang glider according to the present invention not only can soar by catching upcurrents with both its wings kept stationary as in the case of a conventional hang glider, but can also take off and ascend by flapping both main wings, like a bird flapping its wing, by moving the pedals up and down (the pedals are moved by muscular strength of a pilot). Also, a change of direction can easily be carried out by individually drawing down either the right main wing or the left main wing by operation of the associated pedal.

What is claimed is:

1. A human powered hang glider, comprising:
   a frame adapted to support a human operator, and having a front end, a rear end, and opposing sides;
   a pair of main wings extending in opposing directions from respective ones of said sides of said frame, each of said main wings having an inner end, an outer end, an elongated leading edge, and a trailing edge;
   a pair of universal joints respectively swingably connecting inner ends of said leading edges of said main wings to said respective ones of said sides of said frame;
   pedals adapted to be operated by the human operator;
   transmission means, operably connected between said main wings and said pedals, for causing said main wings to swing upwardly and downwardly about said universal joints independently of one another, respectively, upon operation of said pedals; and
   wherein said trailing edges of said main wings are substantially free of connection with said frame, such that upon upward swinging of said main wings about said universal joints, respectively, said trailing edges of said main wings move upwardly but lag behind the motion of said leading edges of said main wings, respectively, and upon downward swinging movement of said main wings about said universal joints, respectively, said trailing edges of said main wings move downwardly but lag behind the motion of said leading edges of said main wings, respectively.

2. A human powered hang glider as recited in claim 1, wherein
   said transmission means comprises a pair of ropes, each of said ropes being fixed at one end to a respective one of said main wings and at the other end to a respective one of said pedals.

3. A human powered hang glider as recited in claim 1, further comprising
   front rope means, connected between said frame and said main wings, respectively, for limiting an amount by which said main wings can swing rearwardly.

4. A human powered hang glider as recited in claim 3, further comprising
   rear rope means, connected between said frame and said trailing edges of said main wings, respectively, for limiting an amount by which said trailing edges of said main wings can swing upward and downward.

5. A human powered hang glider as recited in claim 1, further comprising
   rear rope means, connected between said frame and said trailing edges of said main wings, respectively, for limiting an amount by which said trailing edges of said main wings can swing upward and downward.

6. A human powered hang glider, comprising:
   a frame adapted to support a human operator, and having a front end, a rear end, and opposing sides;
   a pair of main wings extending in opposing directions from respective ones of said sides of said frame, each of said main wings having an inner end, an outer end, an elongated leading edge, and a trailing edge;
   a pair of universal joints respectively swingably connecting inner ends of said leading edges of said main wings to said respective ones of said sides of said frame;
   pedals adapted to be operated by the human operator;
   transmission means, operably connected between said main wings and said pedals, for causing said main wings to swing upwardly and downwardly about said universal joints, respectively, upon operation of said pedals;
   wherein said trailing edges of said main wings are substantially free of connection with said frame, such that upon upward swinging of said main wings about said universal joints, respectively, said trailing edges of said main wings move upwardly but lag behind the motion of said leading edges of said main wings, respectively, and upon downward swinging movement of said main wings about said universal joints, respectively, said trailing edges of said main wings move downwardly but lag behind the motion of said leading edges of said main wings, respectively; and
   wherein said frame comprises a pair of parallel main frame members, and a pair of upstanding posts connected to said main frame members, respectively, said universal joints being respectively connected to said frame at upper portions of said posts, respectively.

7. A human powered hang glider as recited in claim 6, further comprising
   front wheels rotatably mounted at bottom ends of said main frame members, respectively.

8. A human powered hang glider as recited in claim 7, wherein
   said frame further comprises a pair of auxiliary frame members extending from said main frame members, respectively, said auxiliary frame members being substantially perpendicular to said posts.

9. A human powered hang glider as recited in claim 8, further comprising
   rear wheels rotatably mounted at bottom ends of said auxiliary frame members, respectively.

10. A human powered hang glider as recited in claim 6, wherein
    biasing means are provided for biasing said leading edges of said main wings upwardly, respectively.

11. A human powered hang glider as recited in claim 10,
    said frame further comprises an upper frame member extending transversely between said upper portions of said posts, and a lower frame member extending transversely between lower portions of said posts; and
    said biasing means comprises a pair of coil springs interposed between said upper frame member and said leading edges of said main wings, respectively.

12. A human powered hang glider as recited in claim 6, wherein
    said frame further comprises a pair of keel members extending forwardly and rearwardly and substantially perpendicular to said posts.

13. A human powered hang glider as recited in claim 12, wherein
    rear ends of said keel members cross one another, and a tail wing member is mounted to said rear ends of said keel members to form a tail wing.

14. A human power hang glider as recited in claim 6, further comprising front rope means, connected between said keel members and said main wings, respectively, for limiting an amount by which said main wings can swing rearwardly.

15. A human powered hang glider as recited in claim 14, further comprising rear rope means, connected between said keel members and said trailing edges of said main wings, respectively, for limiting an amount by which said trailing edges of said main wings can swing upward and downward.

16. A human powered hang glider as recited in claim 6, further comprising rear rope means, connected between said keel members and said trailing edges of said main wings, respectively, for limiting an amount by which said trailing edges of said main wings can swing upward and downward.

* * * * *